2 Sheets—Sheet 1.

C. P. BOWEN.
Machine for Pitting and Cutting Fruit.

No. 204,189. Patented May 28, 1878.

Witnesses
Jno. L. Bowe
Geo. H. Strong

Inventor
Charles P. Bowen
by Dewey &
Attys.

2 Sheets—Sheet 2.

C. P. BOWEN.
Machine for Pitting and Cutting Fruit.

No. 204,189. Patented May 28, 1878.

Witnesses
Jno. L. Boyne
Geo. H. Strong

Inventor
Charles P. Bowen
by Dewey & Co
Attys

UNITED STATES PATENT OFFICE.

CHARLES P. BOWEN, OF SILVER CITY, IDAHO TERRITORY.

IMPROVEMENT IN MACHINES FOR PITTING AND CUTTING FRUIT.

Specification forming part of Letters Patent No. 204,189, dated May 28, 1878; application filed February 16, 1878.

*To all whom it may concern:*

Be it known that I, CHARLES P. BOWEN, of Silver City, county of Owyhee, Idaho Territory, have invented a Fruit Cutting and Pitting Machine; and I do hereby declare the following to be a full, clear, and exact description thereof, reference being had to the accompanying drawings.

My invention relates to an improved device for cutting and pitting or taking the core or stone out of fruit.

It consists in an endless belt with peculiar self-adjusting carriers, and revolved by suitable mechanism, and a tube with extended springs carrying knives that cut the fruit into suitable pieces and permit the pit or core to pass out of the way through the tube, while the separated fruit is carried to a suitable receiver.

Figure 1:
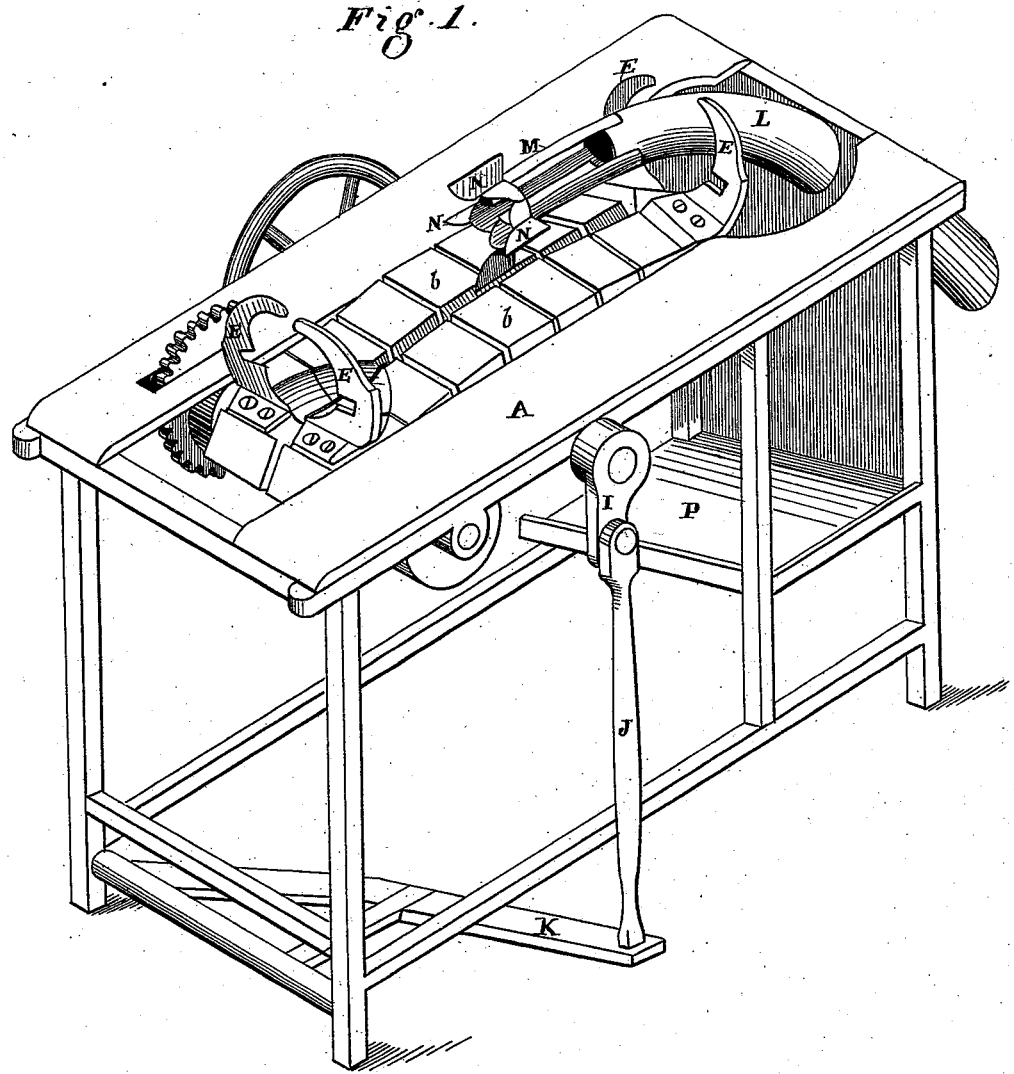
Figure 2:
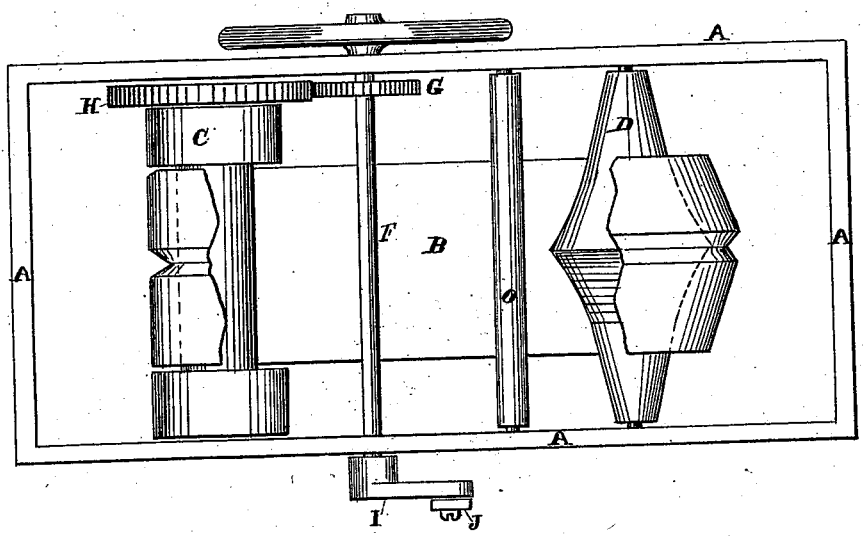
Figure 3:
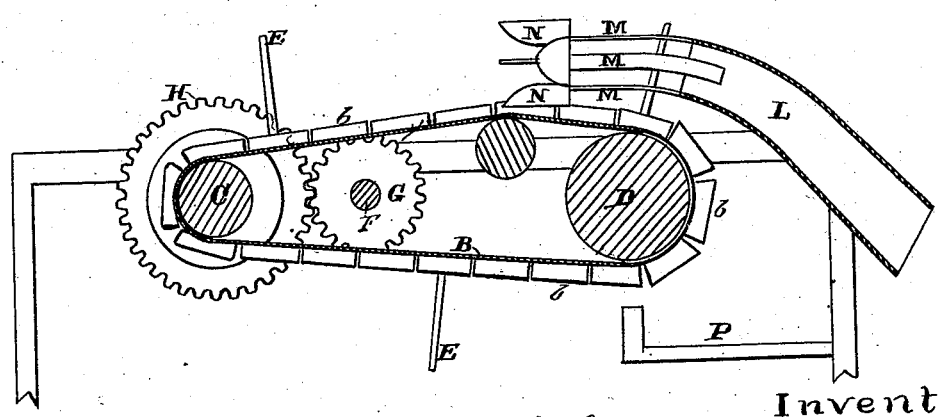

Referring to the accompanying drawing, Figure 1 is a general view of my machine. Figs. 2 and 3 are sections and detailed views.

A is a suitable frame-work, having a revolving belt, B, running on pulleys C and D. This revolving belt has pieces of wood b, in two rows, fastened to its outer surface, and at suitable intervals are placed metallic backing-pieces or carriers E, against which the fruit is placed, resting in depressions in the wood surface of the belt, just in front of the carriers.

The revolving belt B is driven by means of a shaft, F, having a pinion, G, on one end, meshing with a gear, H, on the end of the drum or pulley C. The said shaft receives motion by means of a crank, I, connecting-rod J, and treadle K at one end, if intended for manual work; or it may be connected with other power. A fly-wheel is placed on the driving-shaft to steady its motion.

Upon the top of the frame-work, at one end, a tube, L, is secured, having at its upper end elongated springs M, of flat steel. These springs hold knives N of peculiar shape, as shown in Figs. 1 and 3, with circular and radial blades; and when the carriers bring the fruit to these knives they cut the fruit in pieces, and at the same time the springs allow the blades to spread and take the pit or core into the tube L, where it passes out of the way.

The carriers are peculiarly formed, (see Fig. 1,) having somewhat the crescent shape, with the horns turned inwardly, and made in sections, attached to the two halves of the wooden portion b of the belt B. These carriers are also slotted at the sides, so that they will pass the knives, and they are also caused to open or spread by the passage of the belt over a cone-pulley, D, just beyond the cutters, thus clearing themselves of the fruit and dropping it into the receptacle beneath.

Immediately under the knife-blades N, and underneath the belt B, a roller, O, is placed, that raises the belt at this place, forming an incline with the head-pulley D, so as to deliver the fruit directly to the knives and clear it from the belt B.

The head-pulley D is made crowning or double-cone shaped, and as the revolving belt B passes over it, the pieces of wood on its surface open at the center, thus spreading the carriers and facilitating the discharge of cut fruit into a trough, P, below.

The operation of my machine is as follows: Motion is communicated to the belt B from the treadle and its connections with the driving-shaft. A peach or other fruit is placed against the backing-piece or carrier E and forced onto the knives N, and is quartered by them, the pieces falling down the incline made by the belt B in passing from the roller O to the head-pulley D. The pieces of fruit drop into a trough, P, below, while the pit is carried forward, passing between the springs that hold the knives N, and from thence into the tube L.

Thus it will be seen that the fruit is expeditiously quartered, while the pits pass out of the way.

The fruit should always be placed with the blossom end toward the knives, so that the waste will be reduced to a minimum.

Having thus described my invention, what I claim as new, and desire to secure by Letters Patent, is—

1. The endless belt B, with its longitudinally-divided face-blocks b, and having the carriers E, as shown, in combination with the elastically-mounted three-bladed knives N, to pit and divide the fruit, and the core-carrier L, substantially as herein described.

2. The carrying-belt B, with its rigid longitudinally-divided face-blocks b, in combination with the conical pulley D, whereby the blocks are caused to open, substantially as herein described.

3. The belt B, with its longitudinally-divided face-blocks, having the two-part carriers E mounted upon the opposite sides thereof, said carriers being slotted, so as to pass the knives, substantially as herein described.

4. The knives N, having the curved blades for separating the pit from the fruit, in combination with the radial blades for subdividing the fruit, and the spring-arms M, substantially as and for the purpose herein described.

In witness whereof I have hereunto set my hand and seal.

CHAS. P. BOWEN. [L. S.]

Witnesses:
GEO. H. STRONG,
FRANK H. BROOKS.